United States Patent
Nagura et al.

(10) Patent No.: US 8,584,784 B2
(45) Date of Patent: Nov. 19, 2013

(54) SADDLE TYPE VEHICLE

(75) Inventors: Hidenori Nagura, Wako (JP); Junichi Sakamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 122 days.

(21) Appl. No.: 13/353,455

(22) Filed: Jan. 19, 2012

(65) Prior Publication Data
US 2012/0193162 A1 Aug. 2, 2012

(30) Foreign Application Priority Data
Jan. 31, 2011 (JP) .................. 2011-018725

(51) Int. Cl.
*B62M 7/12* (2006.01)

(52) U.S. Cl.
USPC .......................... 180/228; 180/227

(58) Field of Classification Search
USPC ......................... 180/219, 227, 228
See application file for complete search history.

(56) References Cited

U.S. PATENT DOCUMENTS

| | | | | |
|---|---|---|---|---|
| 4,324,306 A * | 4/1982 | Ishihara et al. | ............... | 180/228 |
| 4,373,602 A * | 2/1983 | Tomita et al. | ................. | 180/227 |
| 4,696,364 A * | 9/1987 | Enoki et al. | .................. | 180/228 |
| 4,724,921 A * | 2/1988 | Ohta et al. | .................... | 180/228 |
| 4,809,801 A * | 3/1989 | Enoki et al. | .................. | 180/228 |
| 7,461,716 B2 * | 12/2008 | Hayashi et al. | ............... | 180/228 |
| 7,789,186 B2 * | 9/2010 | Shimozato et al. | ........... | 180/299 |
| 2007/0074920 A1 * | 4/2007 | Hayashi et al. | ............... | 180/228 |

FOREIGN PATENT DOCUMENTS

JP 2003-341575 A 12/2003

* cited by examiner

*Primary Examiner* — Kevin Hurley
(74) *Attorney, Agent, or Firm* — Birch, Stewart, Kolasch & Birch, LLP

(57) ABSTRACT

In a saddle type vehicle having a swing type power unit swingably supported on the vehicle wherein the vehicle length can be made shorter. A motorcycle includes a link mechanism extending to the rear from a body frame through a link pivot. The swing type power unit includes an engine. A rear wheel is supported rotatably and swingably on the link mechanism. A cross frame extends between a pair of left and right lower frames with a link restriction section for restricting the turning amount of the link mechanism hanging downwardly from the cross frame. The link pivot is disposed under the lower frames.

20 Claims, 9 Drawing Sheets

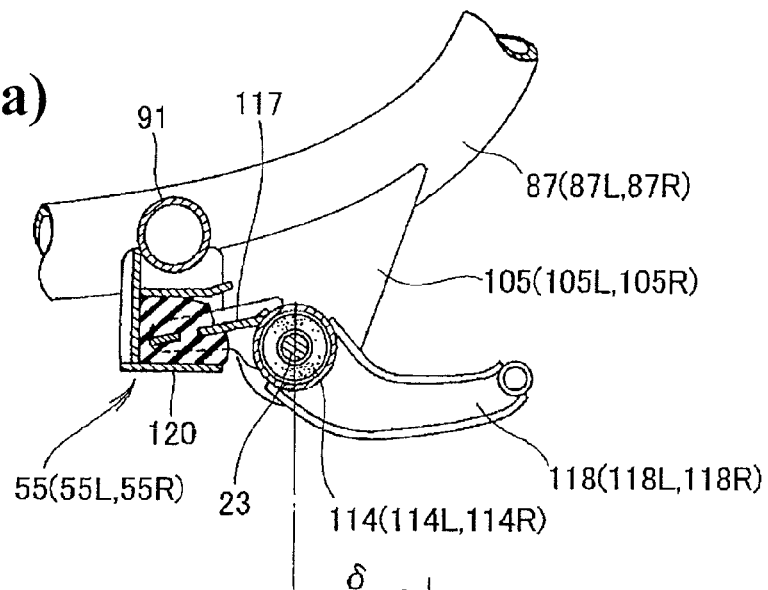
FIG. 9(a) EXAMPLE
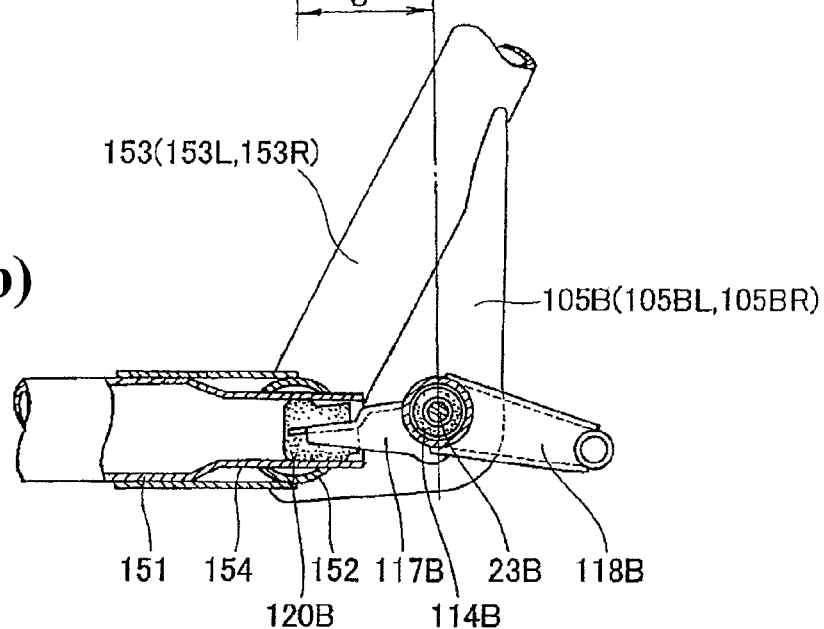
FIG. 9(b) COMPARATIVE EXAMPLE

SADDLE TYPE VEHICLE

CROSS-REFERENCE TO RELATED APPLICATIONS

The present application claims priority under 35 USC 119 to Japanese Patent Application No. 2011-018725 filed Jan. 31, 2011 the entire contents of which are hereby incorporated by reference.

BACKGROUND OF THE INVENTION

1. Field of the Invention

The present invention relates to an improvement in a saddle type vehicle in which a swing type power unit having an engine and a rear wheel is swingably provided on a body frame.

2. Description of Background Art

A saddle type vehicle in which a swing type power unit is swingably provided on a body frame is known. See, for example, Japanese Patent Laid-open No. 2003-341575, FIG. 7. As shown in FIG. 7 of Japanese Patent Laid-open No. 2003-341575, in a rear end portion of a main frame section (27) (a parenthesized numeral indicates a reference symbol used in Japanese Patent Laid-open No. 2003-341575, here and hereafter) a tubular rubber support section (31), and an arm (52) is inserted in the rubber support section (31) through a stopper rubber (53). A link member (46) is mounted to the arm (52) through an outer tube (47), and a link shaft (45) is swingably supported on a rearward end portion of the link member (46) through a turning tube (44). An inner tube (48) is coaxially provided inside the outer tube (47), with a rubber bush therebetween, and a pivot (51) is inserted in the inner tube (48).

In the technology disclosed in Japanese Patent Laid-open No. 2003-341575, the pivot (51) is disposed rearwardly of the main frame section (27).

When the pivot (51) is thus disposed rearwardly of the main frame section (27), the vehicle length is increased by the distance by which the pivot (51) is displaced rearwardly from the main frame section (27).

It is desirable, in saddle type vehicles in which a swing type power unit is swingably supported, to provide a technology by which the vehicle length can be shortened.

SUMMARY AND OBJECTS OF THE INVENTION

It is an object of an embodiment of the present invention to provide, in a saddle type vehicle in which a swing type power unit is swingably supported on a body frame, a technology by which the vehicle length can be made shorter.

According to an embodiment of the present invention, a saddle type vehicle is provided in which a body frame including a down frame extending rearwardly and downwardly from a head pipe steerably supporting a steering system with a pair of left and right lower frames extended rearward from a lower portion of the down frame, and seat frames extending rearwardly upwardly from rear end portions of the lower frames. A link mechanism extends rearwardly from the body frame through a link pivot with a swing type power unit having an engine generating power and having a rear wheel rotatably mounted at a rear end portion thereof being provided on the link mechanism. Thus, the swing type power unit is swingably supported on the body frame, wherein a cross frame extends between the pair of left and right lower frames and a link restriction section which restricts a turning amount of the link mechanism is hung from the cross frame. Thus, the link pivot is disposed under the pair of left and right lower frames.

According to an embodiment of the present invention, the saddle type vehicle includes the link restriction section having a box section formed in a box-like shape opening rearwardly with an elastic member inserted in the box section.

According to an embodiment of the present invention, the saddle type vehicle includes a plurality of the above-mentioned link restriction sections are arranged along a longitudinal direction of the cross frame.

According to an embodiment of the present invention, the saddle type vehicle is provided with a front cross frame which is located below the cross frame by being curved in a downwardly projecting shape and extending between the left and right lower frames forwardly of the cross frame with a lower end of the down frame being connected to the front cross frame.

According to an embodiment of the present invention, the saddle type vehicle includes the front cross frame being disposed to overlap with the link restriction section as viewed in the back-and-forth direction of the vehicle. A lower end of the link restriction section is disposed above a lower end of the front cross frame.

According to an embodiment of the present invention, the saddle type vehicle includes the cross frame disposed a predetermined distance forwardly of rear ends of the lower frames with link brackets extending downwardly from the lower frames, and the link pivot is supported on lower portions of the link brackets.

According to an embodiment of the present invention, the link restriction section restricts the turning amount of the link mechanism is hung from the cross frame whereby the link pivot is disposed under the pair of left and right lower frames.

Since the link pivot is disposed under the lower frames, the swing type power unit can be disposed rather on the forward side, as compared with the case where the link pivot is disposed rearwardly of the lower frames. With the swing type power unit thus disposed rather on the forward side, the vehicle length can be made shorter.

According to an embodiment of the present invention, the link restriction section has the box section and the elastic member inserted in the box section. Since the turning amount of the link mechanism is restricted by the simple structure in which the link restriction section has the box section and the elastic member, a rise in vehicle cost can be suppressed.

According to an embodiment of the present invention, a plurality of the above-mentioned link restriction sections are arranged. Since the plurality of the link restriction sections are provided, load on the link restriction section is reduced by half and designing of the link restriction section is facilitated, as compared with the case where only one link restriction section is provided.

According to an embodiment of the present invention, the front cross frame is provided on the front lower side of the cross frame which supports the link restriction section(s). The front cross frame is located below the cross frame. Projectiles, such as stones and the like collide against the front cross frame, instead of reaching the link restriction section. In other words, the front cross frame serves as a protector for the link restriction section(s). Since the link restriction sections are protected by the front cross frame, an increase in the material thickness of the link restriction section(s) can be suppressed, so that an increase in vehicle weight can be suppressed.

In addition, since the lower end of the down frame is connected to the front cross frame, rigidity of the body frame can be enhanced.

According to an embodiment of the present invention, the lower end of the link restriction section is disposed above the lower end of the front cross frame, as viewed in the back-and-forth direction. Since the lower end of the link restriction section is guarded by the front cross frame disposed forwardly of the link restriction section, the plate thickness of the link restriction section can be suppressed.

According to an embodiment of the present invention, the link brackets for supporting the link pivot extend downwardly from the lower frames. Since the link brackets extend downwardly from the lower frames, the link brackets can be reduced in size and weight.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 9(a) and 9(b) show views for illustrating a working example of the present invention and a comparative example in comparison.

DETAILED DESCRIPTION OF THE PREFERRED EMBODIMENTS

Figure 1:
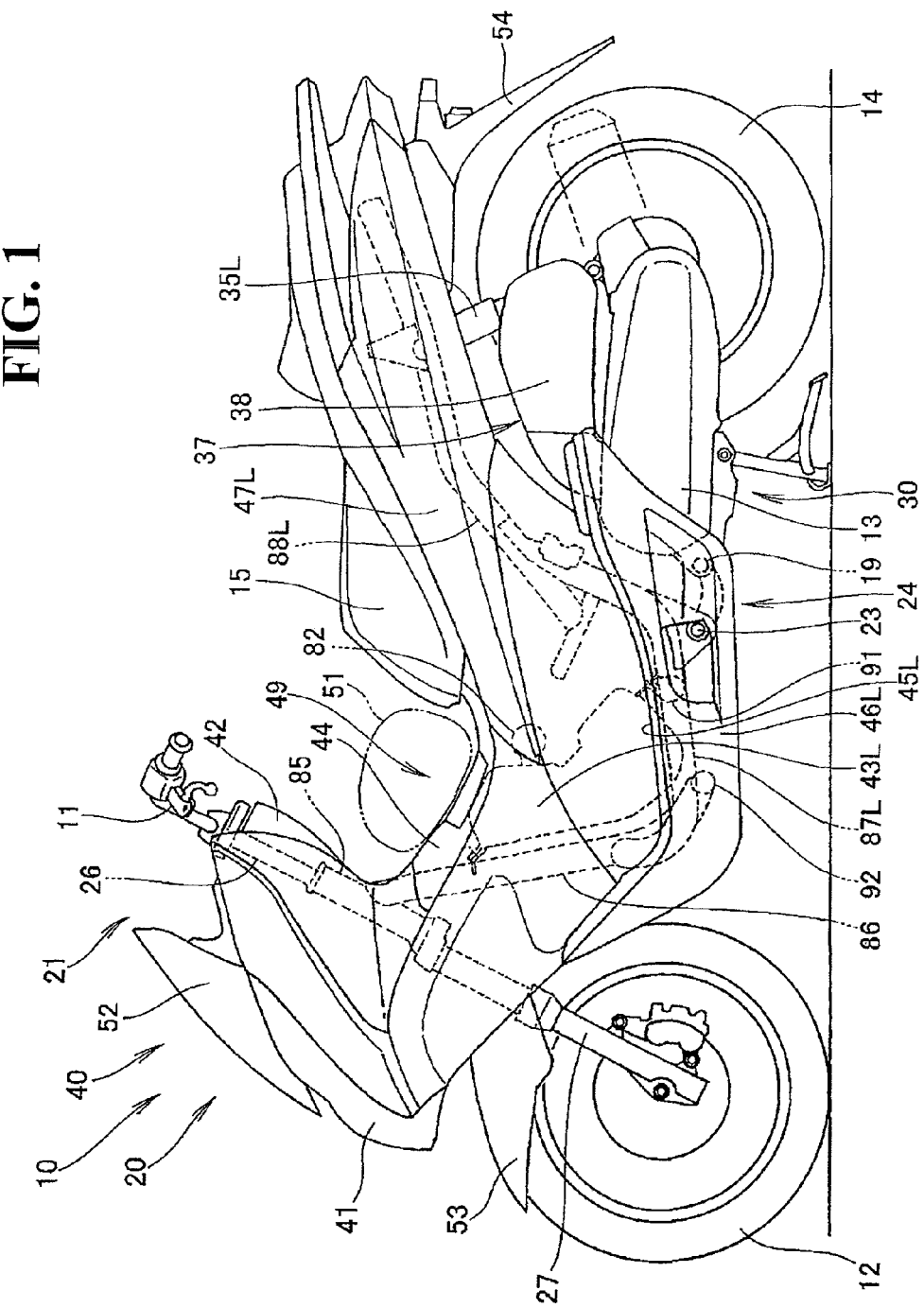
FIG. 1 is a left side view of a motorcycle according to the present invention.

An embodiment of the present invention will be described in detail below. In the drawings and Example below, "UP (upward)," "DOWN (downward)," "FRONT (forward)," "REAR (rearward)," "LEFT (leftward)" and "RIGHT (rightward)" indicate the respective directions as viewed from a driver seated on a motorcycle. In addition, the figures are to be viewed according to the orientation of reference symbols.

A working example of the present invention will be described based on the drawings.

As shown in FIG. 1, a motorcycle 10 is a saddle type vehicle which includes a front wheel 12 disposed at a front portion of the vehicle and steerable by a handle bar 11, an engine 13 as a drive source disposed rearwardly of the front wheel 12, a rear wheel 14 disposed rearwardly of the engine 13 and driven by the engine 13, and a seat 15 provided between the front wheel 12 and the rear wheel 14, and in which a rider or riders are to be seated on the seat 15.

The motorcycle 10 has a body frame 20, and a steering system 21 including the handle bar 11 is provided at a front portion of the body frame 20. In addition, a link mechanism 24 extends rearwardly from the body frame 20 through a link pivot 23 serving as a shaft member. Further, a swing type power unit 30 configured to rotatably support the rear wheel 14 at a rear end portion thereof is mounted to the link mechanism 24, whereby the swing type power unit 30 is swingably supported on the body frame 20.

The swing type power unit 30 is integrally provided with the engine 13 which generates power. The swing type power unit 30 functions also as a swing arm. Left and right shock absorbers 35L and 35R (only reference symbol 35L on the viewer's side is shown) are interposed between a rear portion of the swing type power unit 30 and the body frame 20. In addition, the swing type power unit 30 is provided with an air cleaner 38 which constitutes an intake system 37.

The steering system 21 of the motorcycle 10 includes a steering shaft 26 turnably provided at a front end portion of the body frame 20, a front fork 27 connected to the lower end of the steering shaft 26 and supporting the front wheel 12, and the handle bar 11 attached to the upper end of the steering shaft 26.

The body frame 20 of the motorcycle 10 is covered with a body cover 40.

The body cover 40 includes a front cover 41 covering the front of the vehicle body; a center cowl 42 mounted to the front cover 41 so as to cover an upper portion of the steering system 21 from the vehicle rear side; left and right side covers 43L and 43R (only reference symbol 43L on the viewer's side is shown) extending rearwardly from end portions of the front cover 41. A tunnel member 44 is provided to extend between the left and right side covers 43L and 43R on the front side of the seat 15 and to be continuous with a rear end portion of the center cowl 42. Left and right under covers 46L and 46R (only reference symbol 46L on the viewer's side is shown) are disposed under the left and right side covers 43L and 43R with left and right steps 45L and 45R (only reference symbol 45L on the viewer's side is shown) on which to position the driver's feet. Left and right rear side cover 47L and 47R (only reference symbol 47L on the viewer's side is shown) extend rearwardly, under the seat 15, from the left and right side covers 43L and 43R.

Hereafter, the part which is located forwardly of the seat 15 and which is formed by the left and right side covers 43L and 43R extending upwardly from the left and right steps 45L and 45R and the tunnel member 44 extending between these left and right side covers 43L and 43R will be referred to as a center tunnel 49. Over the center tunnel 49, a leg space 51 is formed through which the driver can bring his or her leg from one side to the other side of the vehicle when he or she gets on or off the vehicle, thereby easily getting on or off the vehicle.

On the upper end of the front cover 41 a windshield 52 is provided. A front fender 53 is disposed over the front wheel 12, and a rear fender 54 is disposed on the rear upper side of the rear wheel 14.

Referring to the next FIG. 2, description will be made of structures of a part under the center tunnel and a part under the seat, etc.

Figure 2:
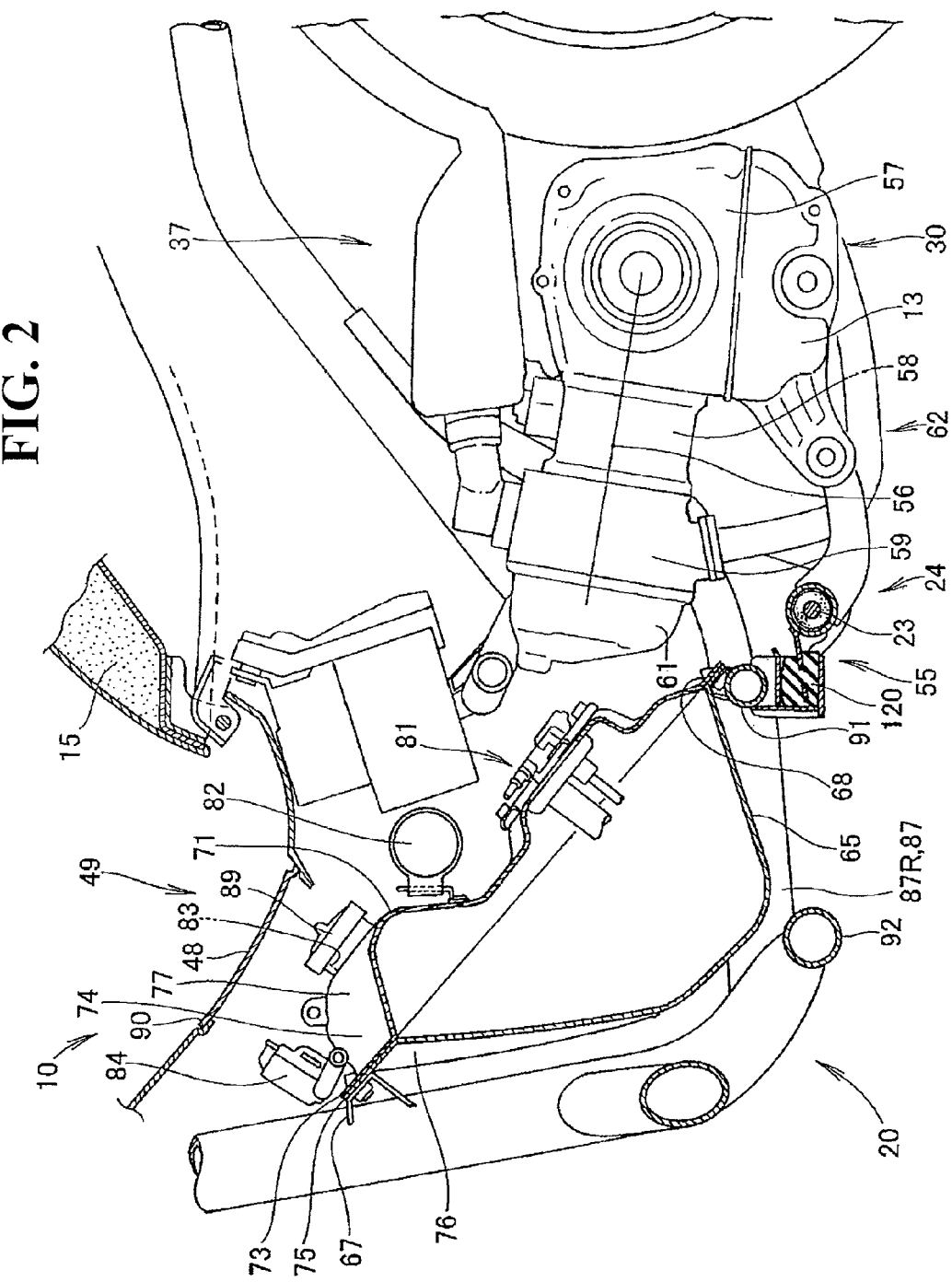
FIG. 2 is a sectional view of a major part of FIG. 1.

As shown in FIG. 2, the link mechanism 24 is provided at a lower portion of the body frame 20, and the swing type power unit 30 having the engine 13 is swingably supported on the link mechanism 24.

Forwardly of the link mechanism 24, a link restriction section 55 for restricting the turning amount of the link mechanism 24 is provided on the body frame 20.

The engine 13 is disposed with its cylinder axis 56 set roughly horizontal and becoming slightly higher on the front side. The engine 13 includes a crankcase 57, a cylinder block 58 mounted to the front end of the crankcase 57, a cylinder head 59 attached to the front end of the cylinder block 58, and a head cover 61 put on the front end of the cylinder head 59.

An intake system 37 is connected to an upper surface of the cylinder head 59, while an exhaust system 62 is connected to a lower surface of the cylinder head 59.

Forwardly of the engine 13, a fuel tank 65 is disposed inside the center tunnel 49. The fuel tank 65 is mounted to the body frame 20 through a first tank bracket 67 and a second tank bracket 68 provided rearwardly of the first tank bracket 67.

The fuel tank 65 is a vessel which is roughly triangular in shape in a side view of the vehicle with an upper surface 71 of the fuel tank being inclined rearwardly downwardly. The fuel tank 65 is formed by joining an upper half 74 having an upper flange portion 73 and a lower half 76 having a lower flange portion 75 to each other at the upper and lower flange portions 73 and 75. These upper and lower flange portions 73 and 75 extend rearwardly downwardly. The upper half 74 has a bulged portion 77 bulged upward from the upper flange portion 73.

A fuel pump 81 for feeding fuel to the intake system 37 is attached to the upper half 74 of the fuel tank 65 with a canister 82 for adsorbing gas from fuel that is evaporated in the fuel tank 65 being mounted onto a front upper side of the fuel pump 81. The canister 82 is provided with a fuel filler 83 on a front upper side thereof with the bulged portion 77 extending upwardly being provided forwardly of the fuel filler 83, and a purge control valve 84 is provided forwardly of the bulged portion 77. The purge control valve 84 is attached to the fuel tank 65. The purge control valve 84 is a member for controlling the supply of the fuel gas accumulated in the canister 82 to the intake system 37 of the engine 13.

Figure 3:
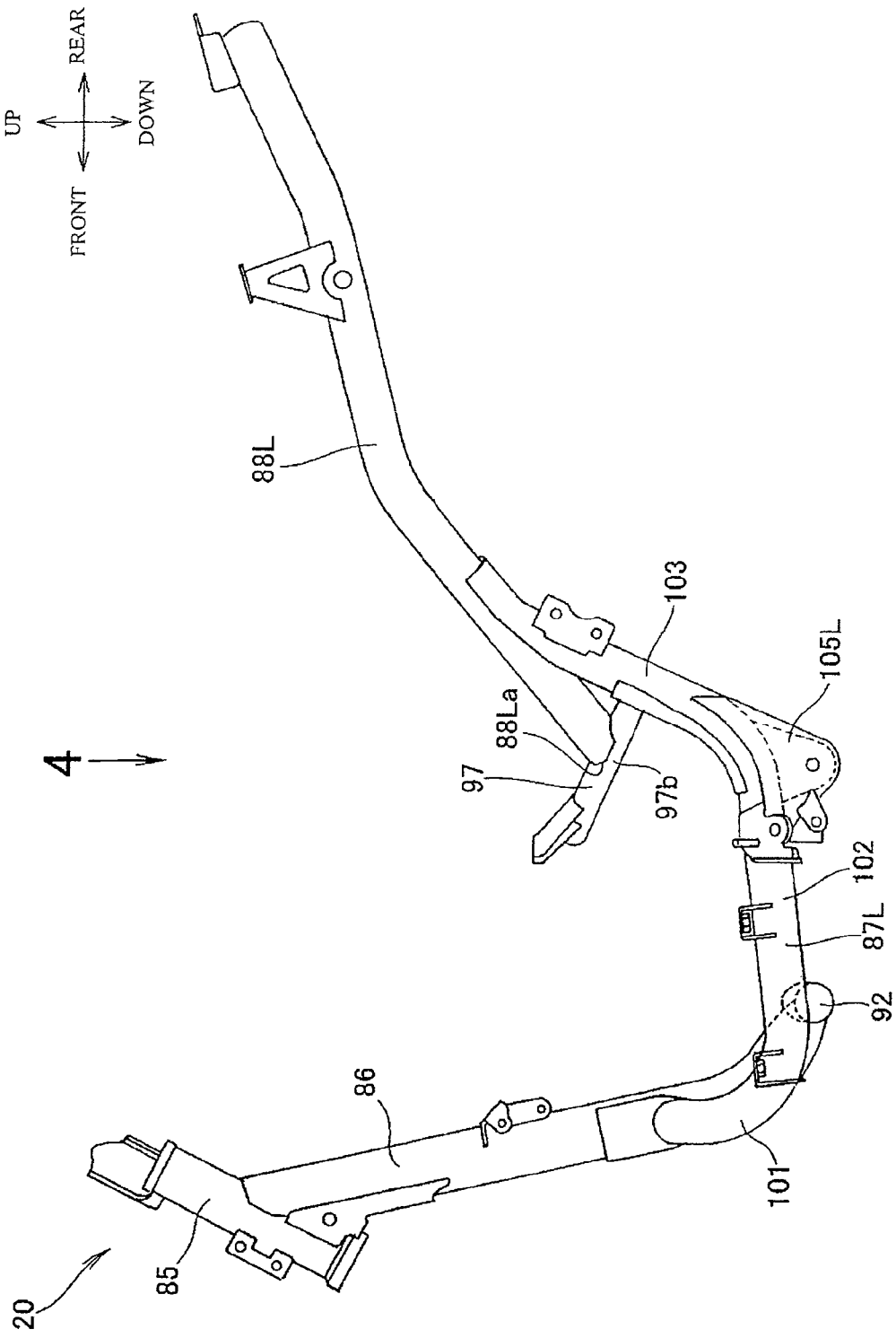
FIG. 3 is a left side view of a body frame.
Figure 4:
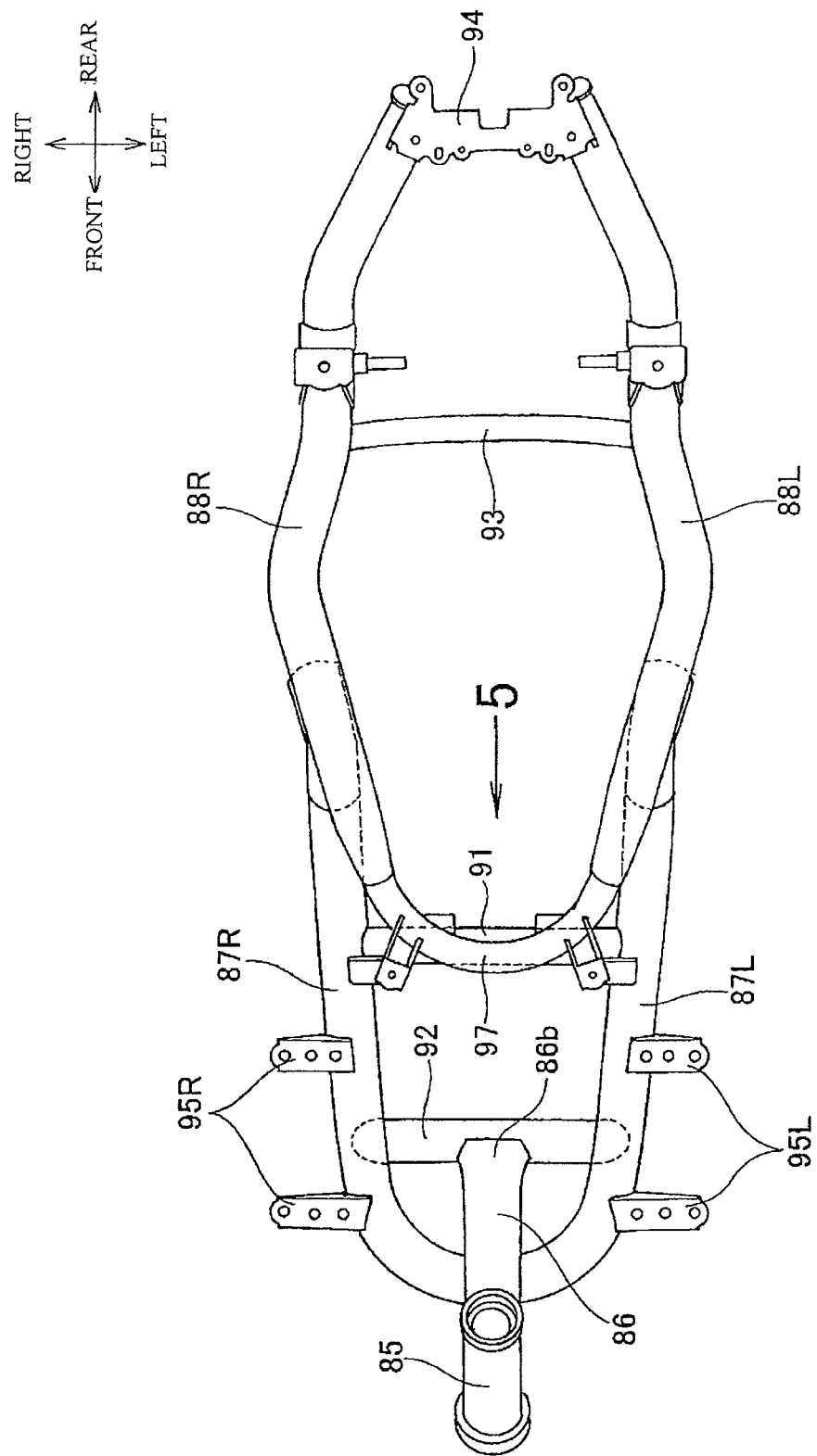
FIG. 4 is a plan view taken along arrow 4 of FIG. 3.

Referring to FIGS. 3 and 4, a description will be made of the configuration of the body frame.

As shown in FIG. 3, the body frame 20 is composed mainly of a head pipe 85 that steerably supports the steering system (in FIG. 1, reference symbol 21) at the front end thereof with a down frame 86 extending rearwardly downwardly from the head pipe 85 with a pair of left and right lower frames 87L and 87R (only reference symbol 87L on the viewer's side is shown) extending rearwardly from a lower portion of the down frame 86 and seat frames 88L and 88R (only reference symbol 88L on the viewer's side is shown) extending rearwardly upwardly from the rear ends of the lower frames 87L and 87R.

As shown in FIG. 4, a cross frame 91 extends between the left and right lower frames 87L and 87R, and a front cross frame 92 extends between the left and right lower frames 87L and 87R on the front side of the cross frame 91. The lower end 86b of the down frame is connected to the front cross frame 92. With the lower end 86b of the down frame 86 thus connected to the front cross frame 92, the front cross frame 92 can be reinforced with the down frame 86.

A seat cross frame 93 extends between the seat frames 88L and 88R, and a rear cross frame 94 extends between the seat frames 88L and 88R on the rear end of the seat frames 88L and 88R.

The left and right lower frames 87L and 87R are fitted with step stays 95L and 95R for fixing steps on which the driver's feet are to be put.

Referring to FIG. 3 as well, more specifically, the left and right lower frames 87L and 87R each include a descending portion 101 extended downwardly with a horizontal portion 102 extending rearwardly from the descending portion 101 and a slant portion 103 extending obliquely rearwardly and upwardly from the horizontal portion 102, in this order towards the rear. In addition, the rear ends of the left and right lower frames 87L and 87R (the rear ends of the left and right slant portions 103) are connected respectively to intermediate portions of the left and right seat frames 88L and 88R.

Between the left and right slant portions 103, a U-shaped member 97 being roughly U-shaped in plan view of the vehicle and supporting the seat (in FIG. 1, reference symbol 15) extends, with the closed portion (of the U-shape) on the front side. The front ends 88La and 88Ra (only reference symbol 88La on the viewer's side is shown) of the left and right seat frames are firmly attached respectively to intermediate portions 97b of the U-shaped member. In the vicinity of the cross frame 91, plate-shaped left and right link brackets 105L and 105R (only reference symbol 105L on the viewer's side is shown) are firmly attached respectively to those portions of the left and right lower frames 87L and 87R which each range from a rear part of the horizontal portion 102 to a front part of the slant portion 103.

Hereinafter, the link restriction section attached to the cross frame, etc. will be described.

Figure 5:
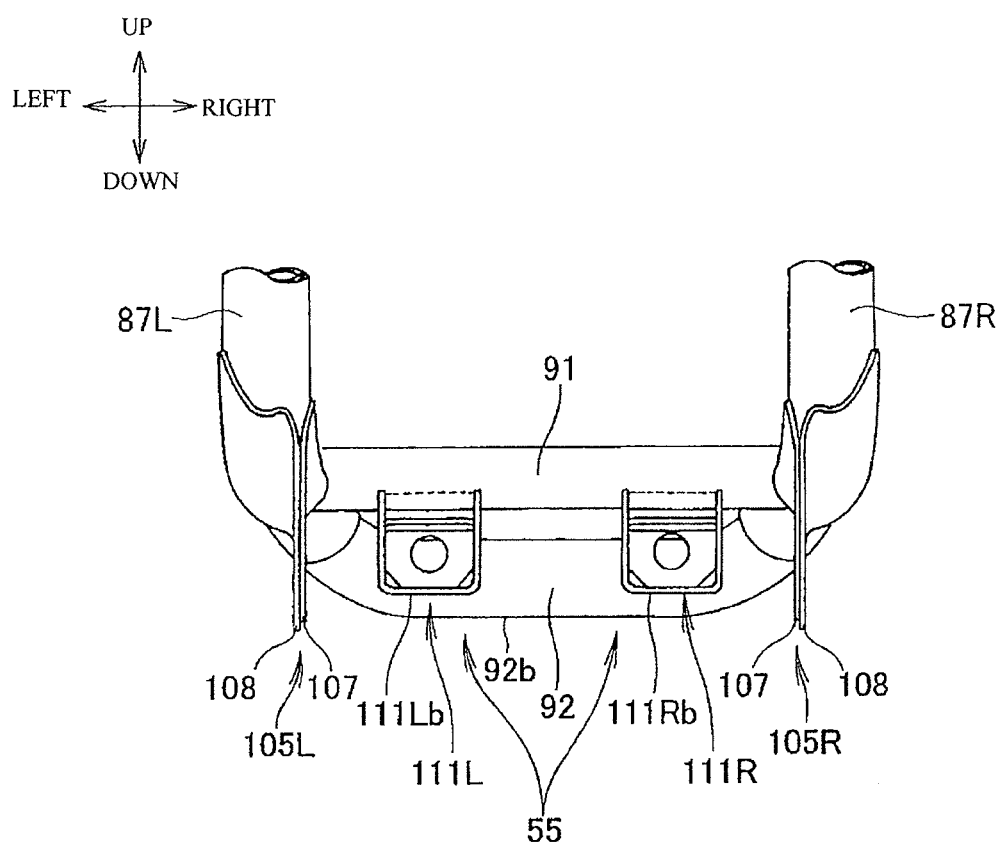
FIG. 5 is a rear view taken along arrow 5 of FIG. 4.

As shown in FIG. 5, the plate-shaped left and right link brackets 105L and 105R each have an inner member 107 and an outer member 108 adhered to each other on the lower side. Since the left and right link brackets 105L and 105R each have the inner member 107 and the outer member 108, the rigidity of the link brackets 105L and 105R can be enhanced as compared with the case where they are each composed of only one member.

Box sections 111L, 111R as components of the link restriction section 55 are attached to left and right portions (spaced along the vehicle width direction) of the cross frame 91 in a hanging manner.

The front cross frame 92 is provided forwardly of the cross frame 91. The front cross frame 92 extends between the left and right lower frames 87L and 87R in the state of being located below the cross frame 91 by being curved into a downwardly projecting shape. In other words, the front cross frame 92 is disposed in such a manner that the lower ends 111Lb and 111Rb of the box sections constituting the link restriction section 55 are located above the lower end 92b of the front cross frame.

With the front cross frame 92 extended downwardly and disposed to be lower than the cross frame 91, the box sections 111L and 111R constituting the link restriction section 55 can be protected. Since the link restriction section 55 is protected by the front cross frame 92, it is unnecessary to increase the material thickness of the link restriction section 55, so that an increase in vehicle weight can be suppressed.

Hereinafter, a description will be made of a link unit which is a component of the link mechanism.

Figure 6A:
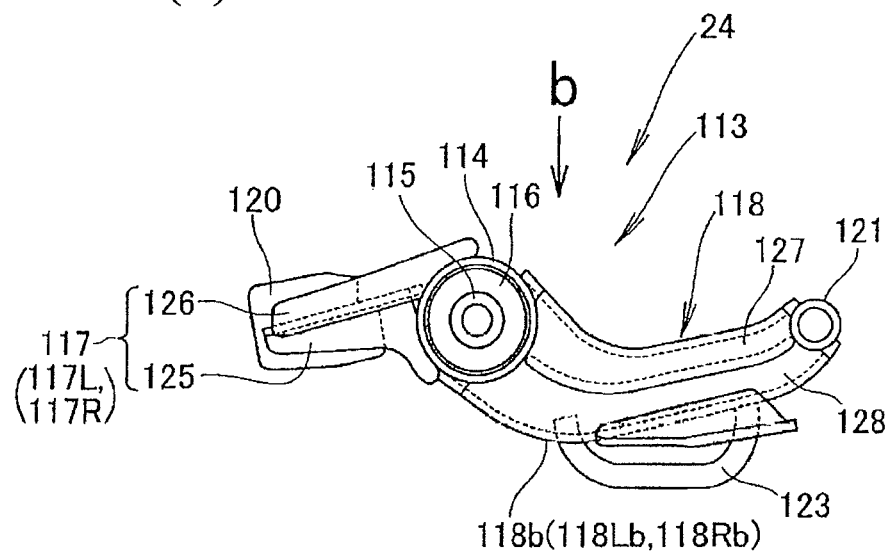
FIGS. 6(a) and 6(b) show views for illustrating a link unit.
Figure 6B:
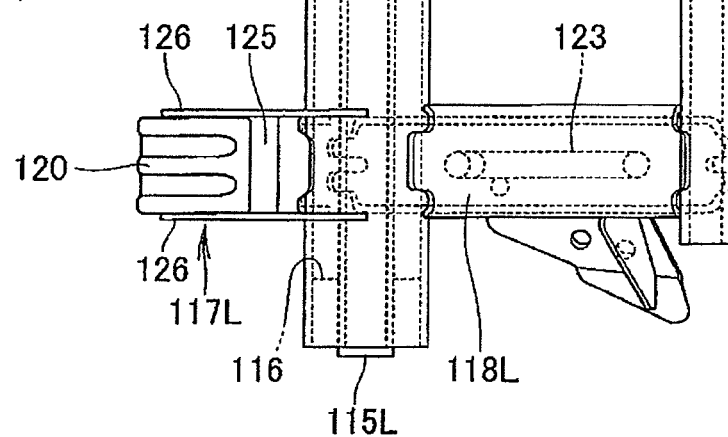

FIG. 6(a) shows a side view of the link unit, while FIG. 6(b) shows a view taken along arrow b of FIG. 6(a).

Referring to FIG. 6(a) and FIG. 6(b), the link unit 113 as a component of the link mechanism 24 is composed mainly of an outer tube 114, left and right inner tubes 115L and 115R which are coaxially disposed inside the outer tube 114 and in which a link pivot (in FIG. 2, reference symbol 23) is inserted, left and right rubber bushes 116, 116 interposed between the outer tube 114 and the left and right inner tubes 115L and 115R, arm sections 117L and 117R which extend forward from the outer tube 114 and to which stopper rubbers 120, 120 as elastic members are mounted, left and right link sections 118L and 118R extending rearwardly from the outer tube 114 and a turning tube 121 which is firmly attached to the rear ends of the left and right link sections 118L and 118R. The link unit 113 extends in the vehicle width direction, and in which a link shaft (in FIG. 1, reference symbol 119) is provided on the side of the swing type power unit 30 and is inserted therein.

An inner collar 122 extends between and connected to the left and right inner tubes 115L and 115R. Guard members 123, 123 are provided respectively at lower surfaces 118Lb and 118Rb of the left and right link sections.

The left and right arm sections 117L and 117R each have a roughly U-shaped member 125 and upper end members 126 rising at both ends of the roughly U-shaped member 125.

In addition, the left and right link sections 118L and 118R each have a structure wherein an upper roughly U-shaped member 127 extends between the outer tube 114 and the turning tube 121, on the upper side, and the upper roughly U-shaped member 127 is firmly attached at both ends thereof to the outer tube 114 and the turning tube 121, while a lower roughly U-shaped member 128 extends between the outer tube 114 and the turning tube 121, on the lower side, and the lower roughly U-shaped member 128 is firmly attached at both ends thereof to the outer tube 114 and the turning tube 121.

The link restriction section which restricts the turning amount of the link mechanism will be detailed below.

Figure 7:
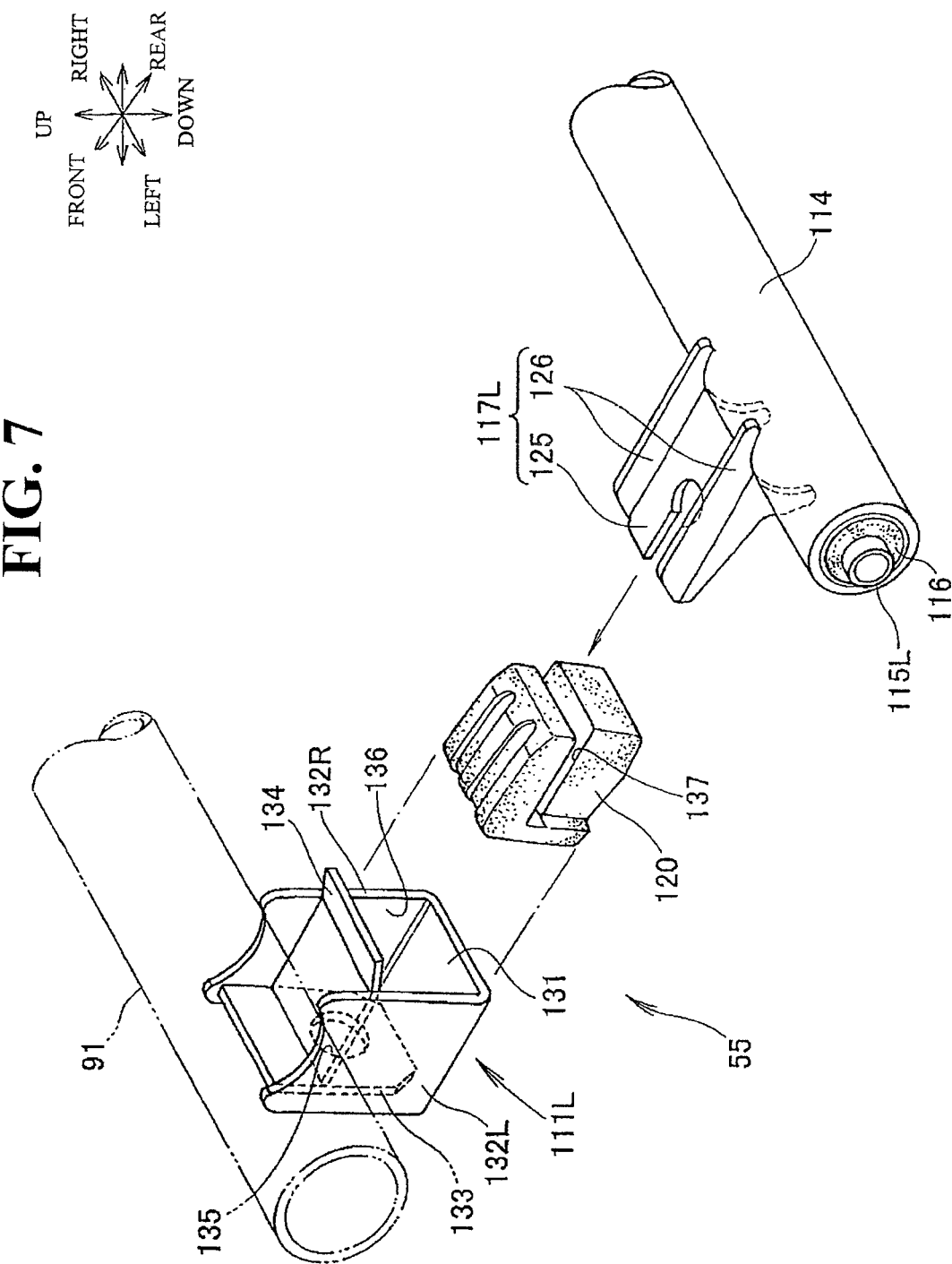
FIG. 7 is an exploded perspective view of a link restriction section.

As shown in FIG. 7, the link restriction section 55 includes the box section 111L formed in a box-like shape opening toward the rear side, and the stopper rubber 120 as an elastic member inserted into the box section 111L. The box section 111L is secured to the cross frame 91 from below.

The box section 111L includes a bottom plate portion 131, left and right wall portions 132L and 132R extended upward from both ends of the bottom plate portion 131, a depth-side wall 133 which extends upwardly from the front end of the bottom portion and which extends between the left and right wall portions 132L and 132R and an upper plate portion 134 extending between the left and right wall portions 132L and 132R at a position above the bottom plate portion 131. The depth-side wall 133 is provided with a hole 135 for breathing.

The stopper rubber 120 is inserted into a space 136 surrounded by the bottom plate portion 131, the left and right wall portions and the upper plate portion 134. The arm section 117L of the link unit 113 is inserted into a groove 137 formed in a rear-side portion of the stopper rubber 120.

Thus, the link restriction section 55 has a simple structure which has the box section 111L and the stopper rubber 120 as an elastic member, so that a rise in the vehicle cost can be suppressed.

While the link restriction section provided on the left side in the vehicle width direction has been described above, the link restriction section of the equivalent structure is provided also on the right side in the vehicle width direction, description of which is omitted.

Figure 8:
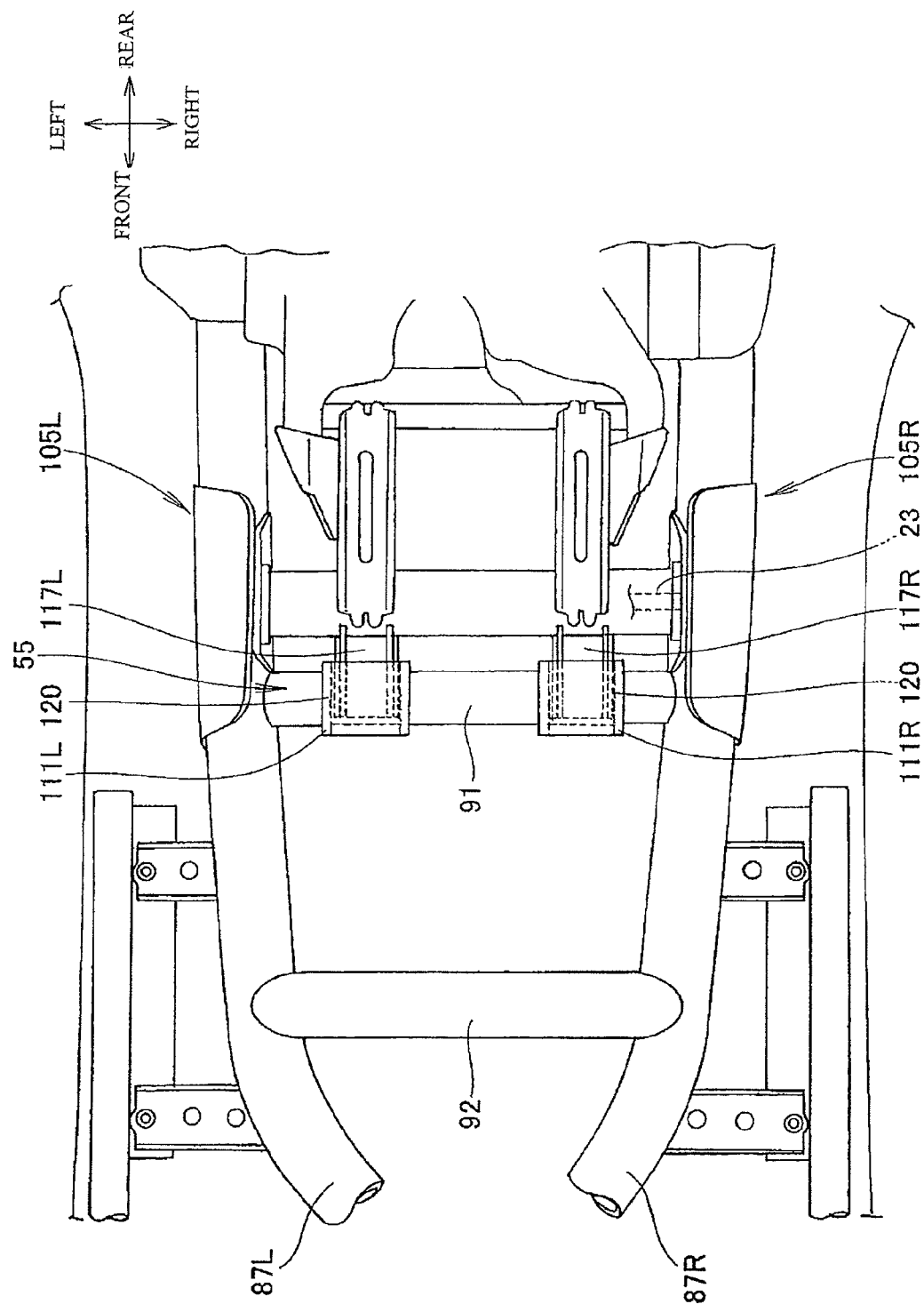
FIG. 8 is a bottom view of the link restriction section.

FIG. 8 shows a state in which the arm sections of the link unit are inserted into the link restriction sections.

The arm sections 117L and 117R of the link unit 113 are inserted into the left and right box sections 111L, 111R through the stopper rubbers 120, 120. Left and right end portions of the link unit 113 are rotatably supported through the link brackets 105L and 105R.

Referring to FIG. 3 as well, the cross frame 92 is disposed at a predetermined distance forwardly from the rear ends of the lower frames 87L and 87R, and the link brackets 105L and 105R extend downwardly from the lower frames 87L and 87R. The link pivot 23 is supported on lower portions of the link brackets 105L and 105R.

Since the link brackets 105L and 105R extend respectively from the lower frames 87L and 87R, it is possible to make the link brackets 105L and 105R smaller in size and weight.

The operation of the saddle type vehicle as above will be described below.

FIG. 9(a) shows an Example of the present invention, wherein the left and right link brackets 105L and 105R extend downwardly respectively from the left and right lower frames 87L and 87R, and the link pivot 23 extends between the left and night link brackets 105L and 105R. Forwardly of the link pivot 23, the cross frame 91 extends between the left and right lower frames 87L and 87R. The link restriction sections 55L and 55R for restricting the turning amount of the link mechanism 24 is hung downwardly from the cross frame 91. The link pivot 23 is inserted in the outer tubes 114L and 114R coaxially. By these arrangements, the link pivot 23 is disposed below the pair of left and right lower frames 87L and 87R.

FIG. 9(b) shows an Comparative Example, wherein at a rear end portion of a single main frame 151 with a cross frame 152 extending in the vehicle width direction, and left and right rear frames 153L and 153R extending upwardly and to the rear from both ends of the cross frame 152. In the main frame 151 a tubular rubber support section 154 is inserted in the manner of penetrating the cross frame 152, an arm 117B is inserted into the rubber support section 154 through a stopper rubber 155, and a link section 118B is attached to the arm 117B through an outer tube 114. A link pivot 23B coaxially extends inside the outer tube 114, and both ends (spaced along the vehicle width direction) of the link pivot 23B are rotatably supported by left and right link brackets 105L and 105R.

In this case, since the arm 117B is inserted to the side of the main frame 151, the link pivot 23B as an axis member is disposed a distance b rearwardly. Therefore, the left and right link brackets 105L and 105R rotatably supporting both ends of the link pivot 23B are provided in the range from a rear end portion of the main frame 151 to the left and right rear frames 105BL and 105BR which extend rearwardly and upwardly.

In connection with this point, according to the present invention, the link restriction sections 55 for restricting the turning amount of the link mechanism 24 are hung downwardly from the cross frame 91, whereby the link pivot 23 is disposed in such a manner so as to get under the lower frames 87L and 87R. Therefore, the swing type power unit 30 can be disposed rather on the forward side, as compared with the case in which the link pivot 23 is disposed rearwardly of the lower frames 87L and 87R. Consequently, the vehicle can be shortened by the length 6.

Returning to FIG. 8, a pair of left and right link restriction sections 55 are arranged along the vehicle width direction. Since the pair of left and right link restriction sections 55 are provided, setting of load endurance of the link restriction section(s) 55 can be performed more easily than in the case of providing only one link restriction section.

In addition, the number of the link restriction sections may be three or four or other arbitrary numbers.

In addition, while the present invention has been applied to a motorcycle in the above embodiment, the invention is also applicable to a saddle type three-wheeled vehicle and to general saddle type vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle vehicle including a body frame with a down frame extending rearwardly downwardly from a head pipe steerably supporting a steering system, a pair of left and right lower frames extending rearwardly from a lower portion of said down frame, and seat frames extending rearwardly upwardly from rear end portions of said lower frames, a link mechanism extends rearwardly from said body frame through a link pivot and a swing type power unit having an engine generating power and having a rear wheel rotatably mounted at a rear end portion thereof is provided on said link mechanism, whereby said swing type power unit is swingably supported on said body frame, the saddle vehicle comprising:
- a cross frame extending between said pair of left and right lower frames; and
- a link restriction section restricting a turning amount of said link mechanism, said link restriction being hung downwardly from said cross frame, whereby said link pivot is disposed under said pair of left and right lower frames.

2. The saddle vehicle according to claim 1, wherein said link restriction section comprises a box section formed in a box-like shape opening rearwardly with an elastic member inserted in said box section.

3. The saddle vehicle according to claim 1, wherein a plurality of said link restriction sections are arranged along a longitudinal direction of said cross frame.

4. The saddle vehicle according to claim 2, wherein a plurality of said link restriction sections are arranged along a longitudinal direction of said cross frame.

5. The saddle vehicle according to claim 1, wherein a front cross frame located below said cross frame is curved in a downwardly projecting shape and extends between the left and right lower frames, said front cross frame being provided forwardly of said cross frame with a lower end of said down frame being connected to said front cross frame.

6. The saddle vehicle according to claim 2, wherein a front cross frame located below said cross frame is curved in a downwardly projecting shape and extends between the left and right lower frames, said front cross frame being provided forwardly of said cross frame with a lower end of said down frame being connected to said front cross frame.

7. The saddle vehicle according to claim 3, wherein a front cross frame located below said cross frame is curved in a downwardly projecting shape and extends between the left and right lower frames, said front cross frame being provided forwardly of said cross frame with a lower end of said down frame being connected to said front cross frame.

8. The saddle vehicle according to claim 4, wherein said front cross frame is disposed to overlap with said link restriction section as viewed in the back-and-forth direction of the vehicle, and a lower end of said link restriction section is disposed above a lower end of said front cross frame.

9. The saddle vehicle according to claim 1, wherein said cross frame is disposed a predetermined distance forwardly of rear ends of said lower frames with link brackets extending downwardly from said lower frames and said link pivot being supported on lower portions of said link brackets.

10. The saddle vehicle according to claim 2, wherein said cross frame is disposed a predetermined distance forwardly of rear ends of said lower frames with link brackets extending downwardly from said lower frames and said link pivot being supported on lower portions of said link brackets.

11. A frame for a saddle vehicle comprising:
- a down frame extending rearwardly downwardly from a head pipe steerably supporting a steering system;
- a pair of left and right lower frames extending rearwardly from a lower portion of said down frame;
- a link mechanism extending rearwardly from said body frame through a link pivot;
- a swing type power unit provided on said link mechanism, whereby said swing type power unit is swingably supported on said body frame;
  - a cross frame extending between said pair of left and right lower frames; and
  - a link restriction section restricting a turning amount of said link mechanism, said link restriction being hung downwardly from said cross frame, whereby said link pivot is disposed under said pair of left and right lower frames.

12. The frame for a saddle vehicle according to claim 11, wherein said link restriction section comprises a box section formed in a box-like shape opening rearwardly with an elastic member inserted in said box section.

13. The frame for a saddle vehicle according to claim 11, wherein a plurality of said link restriction sections are arranged along a longitudinal direction of said cross frame.

14. The frame for a saddle vehicle according to claim 12, wherein a plurality of said link restriction sections are arranged along a longitudinal direction of said cross frame.

15. The frame for a saddle vehicle according to claim 11, wherein a front cross frame located below said cross frame is curved in a downwardly projecting shape and extends between the left and right lower frames, said front cross frame being provided forwardly of said cross frame with a lower end of said down frame being connected to said front cross frame.

16. The frame for a saddle vehicle according to claim 12, wherein a front cross frame located below said cross frame is curved in a downwardly projecting shape and extends between the left and right lower frames, said front cross frame being provided forwardly of said cross frame with a lower end of said down frame being connected to said front cross frame.

17. The frame for a saddle vehicle according to claim 13, wherein a front cross frame located below said cross frame is curved in a downwardly projecting shape and extends between the left and right lower frames, said front cross frame being provided forwardly of said cross frame with a lower end of said down frame being connected to said front cross frame.

18. The frame for a saddle vehicle according to claim 14, wherein said front cross frame is disposed to overlap with said link restriction section as viewed in the back-and-forth direction of the vehicle, and a lower end of said link restriction section is disposed above a lower end of said front cross frame.

19. The frame for a saddle vehicle according to claim 11, wherein said cross frame is disposed a predetermined distance forwardly of rear ends of said lower frames with link brackets extending downwardly from said lower frames and said link pivot being supported on lower portions of said link brackets.

20. The frame for a saddle vehicle according to claim 12, wherein said cross frame is disposed a predetermined distance forwardly of rear ends of said lower frames with link brackets extending downwardly from said lower frames and said link pivot being supported on lower portions of said link brackets.

* * * * *